United States Patent
Gokavi et al.

(10) Patent No.: US 11,384,784 B2
(45) Date of Patent: Jul. 12, 2022

(54) FASTENER ASSEMBLY

(71) Applicant: Illinois Tool Works Inc., Glenview, IL (US)

(72) Inventors: Mahantesh Gokavi, Maharashtra (IN); Allande Johnson, Tamil Nadu (IN); Mulla Dastageer, Maharashtra (IN); Abhishek Karambelkar, Maharashtra (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/162,360

(22) Filed: Jan. 29, 2021

(65) Prior Publication Data

US 2021/0239147 A1 Aug. 5, 2021

(30) Foreign Application Priority Data

Jan. 30, 2020 (IN) .............................. 202021004230

(51) Int. Cl.
*F16B 21/06* (2006.01)
*B62D 27/06* (2006.01)
*F16B 5/06* (2006.01)

(52) U.S. Cl.
CPC ............ *F16B 21/065* (2013.01); *B62D 27/06* (2013.01); *F16B 5/065* (2013.01)

(58) Field of Classification Search
CPC ......... F16B 21/065; F16B 5/065; B62D 27/06
See application file for complete search history.

(56) References Cited

U.S. PATENT DOCUMENTS

| | | | | |
|---|---|---|---|---|
| 6,431,585 B1* | 8/2002 | Rickabus | .............. | B60R 21/215 24/114.05 |
| 7,155,783 B2* | 1/2007 | Nessel | ................ | B60R 13/0206 24/289 |
| 7,976,056 B2* | 7/2011 | Kirchen | .............. | B60R 13/0206 280/728.2 |
| 8,297,646 B2* | 10/2012 | Aoki | ................... | F16B 19/1081 280/728.2 |
| 8,316,514 B2* | 11/2012 | Sano | ................... | B60R 13/0206 24/297 |
| 8,347,465 B2* | 1/2013 | Arisaka | ............... | F16B 19/1081 24/297 |
| 8,696,018 B2* | 4/2014 | Yamamoto | ............ | B60R 21/217 280/728.2 |
| 8,950,043 B2* | 2/2015 | Hofmann | ................ | F16B 5/065 24/297 |
| 8,961,092 B2* | 2/2015 | De Jong | ............... | B60R 21/213 411/508 |

(Continued)

*Primary Examiner* — David M Upchurch
(74) *Attorney, Agent, or Firm* — Quarles & Brady LLP (57) ABSTRACT

A fastener assembly includes a grommet and a pin. The grommet includes a body and a collar. The body has a hollow cylindrical cavity that has a first end and a second end opposite to the first end. The body includes flexible snaps connected to an exterior surface of the body. The flexible snaps are to flex in a radial direction with respect to a central longitudinal axis. The collar is provided at the second end of the body. The collar includes engagement members that extend from the collar in a direction opposite to the body to engage with the pin. The pin includes a shaft insertable into the body to cooperate with the flexible snaps to prevent radially inward movement of the flexible snaps.

20 Claims, 9 Drawing Sheets

(56) References Cited

U.S. PATENT DOCUMENTS

| | | | |
|---|---|---|---|
| 9,115,743 B2* | 8/2015 | Yamamoto | F16B 21/065 |
| 9,132,789 B2* | 9/2015 | Suzuki | F16B 19/1081 |
| 10,408,248 B1* | 9/2019 | Safry | F16B 5/0628 |
| 2003/0129040 A1* | 7/2003 | Arisaka | F16B 21/065 411/41 |
| 2005/0220560 A1* | 10/2005 | Shinozaki | F16B 21/065 411/37 |
| 2005/0220561 A1* | 10/2005 | Okada | F16B 19/1081 411/41 |
| 2011/0262243 A1* | 10/2011 | Glickman | F16B 21/02 411/337 |
| 2017/0051780 A1* | 2/2017 | Dickinson | F16B 5/0657 |
| 2019/0219086 A1* | 7/2019 | Lee | F16B 13/0808 |
| 2020/0284280 A1* | 9/2020 | Gokavi | F16B 19/1027 |

* cited by examiner

PRE-PUSH CONDITION

FASTENER ASSEMBLY

CROSS REFERENCE TO RELATED APPLICATIONS

This application is based on, claims priority to, and incorporates herein by reference in its entirety Indian Patent Application No. 202021004230, filed on Jan. 30, 2020, and entitled "FASTENER ASSEMBLY".

BACKGROUND

Various assemblies include panels or components connected to one another. Usually, fasteners are used to secure such components to each other and can find applications across industries. In an example, such fasteners may be used in automotive industry, for instance, for fixing various trims to a body panel. For instance, fasteners may be used to mount upholstery and trim to a roof or floor of the vehicle. The fasteners may have different designs depending on the application for which the fastener is to be used. For example, fasteners used for mounting a carpet to a wall may have a different design from a fastener used for creating a waterproof seal which, in turn may be different from fasteners used for holding components against gravity.

SUMMARY OF EMBODIMENTS OF THE DISCLOSURE

According to one aspect, a fastener assembly comprises a grommet and a pin. The grommet comprises a body that has a hollow cylindrical cavity that has a first end and a second end opposite to the first end. The body comprises flexible snaps connected to an exterior surface of the body. The flexible snaps are to flex in a radial direction with respect to a central longitudinal axis. The grommet further comprises a collar provided at the second end of the body. The collar comprises engagement members that extend from the collar in a direction opposite to the body. The pin comprises a shaft insertable into the body to cooperate with the flexible snaps to prevent radially inward movement of the flexible snaps. The pin is to engage with the engagement members when inserted into the hollow cylindrical cavity of the body.

According to some embodiments, at a point of connection of each of the flexible snaps to the body, each of the flexible snaps comprises a flexural portion that has a cut-out. In other embodiments, the pin comprises a head end that has a head. The pin further comprises an inserting end opposite to the head end, to insert the pin into the grommet. The pin also comprises a first groove and a second groove. The second groove extends circumferentially on the shaft in proximity of the head end. The first groove extends circumferentially on the shaft and is linearly displaced from the second groove towards the inserting end. The engagement members comprise a first engagement member provided circumferentially in proximity of an edge of the hollow cylindrical cavity of the body and that extends towards the central longitudinal axis to partially overlap with the hollow cylindrical cavity. The first engagement member is to detachably couple with the first groove and the second groove when the pin is inserted into the grommet. The first engagement member is formed as a snap-fit lug. In further embodiments, the first engagement member is to detachably couple with the first groove in a semi-assembled position of the pin in the grommet and is to detachably couple with the second groove in a fully-assembled position of the pin in the grommet. In some embodiments, the engagement members comprise a second engagement member provided circumferentially in proximity of a rim of the collar and that extends towards the central longitudinal axis. The second engagement member is to couple with the head of the pin in a fully-assembled position of the pin in the grommet. The second engagement member is formed as a snap-fit lug. In other embodiments, the grommet comprises a beveled surface at the first end of the grommet. The pin, at an inserting end, comprises a complementary beveled surface to substantially match the beveled surface of the grommet.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

Throughout the drawings, identical reference numbers designate similar elements, but may not designate identical elements. The figures are not necessarily to scale, and the size of some parts may be exaggerated to more clearly illustrate the example shown. Moreover, the drawings provide examples and/or examples consistent with the description; however, the description is not limited to the examples and/or examples provided in the drawings.

DETAILED DESCRIPTION

Generally, in order to hold the components together, fasteners may have to be used. In certain cases, the fasteners may have to hold components against gravity and, therefore, in such applications, certain type of fasteners which are capable of bearing the weight of the component to be held may be used. In an example, the components may be urea tank of a diesel engine-driven vehicle and a cover of the urea tank. For instance, in case of the urea tank, the tank cover may be mounted to the urea tank using an adequate fastener that is capable of bearing the weight of the tank cover which may be placed on the underside of the vehicle and may have to be held against gravity.

In certain cases, such components can be coupled using screws which have considerable holding strength and do not break easily. In such a case, for instance, the urea tank and the tank cover can both have holes to allow insertion of the screws therethrough for coupling the two. Over a period, the screw may be unable to hold the components due to wear and tear of the components. For instance, where the components are vehicular components, the components may undergo greater amount of wear and tear due to vibrations etc. In another case, in an unfavourable scenario that the screw may be damaged, and it may damage along with it both the components that it is used to couple. In either of the cases, the components that are being coupled may have to be serviced, i.e., either repaired or replaced. Such servicing of the component may add to the cost of ownership, for example, of the vehicle which uses the components to be services.

In other cases, conventionally, other types of designs of covers may be used which avoid use of screws for fastening the components. In such other designs, the fastener may be made of a softer material than the material used for screws. As an example, instead of using metallic screws, the fasteners may be made of a hard, plastic material and may be a snap-lock type fastener which couple the cover to the component. In such cases, while the fastener may not damage the components that it couples, the fastener itself may not have a long service life and may break often requiring frequent replacement. This issue may be particularly predominant in cases where the components are connected against gravity using the fastener. In addition, other circumstances may further exacerbate the situation. For instance, where the components are the urea tank and the tank cover therefor, which, as discussed in the above example, are provided on an underside of the vehicle, mud and dirt may accumulate on the tank cover, thereby making the tank cover heavier over time. In such a case, the conventional fasteners may have the tendency to break, thereby requiring frequent repairs or replacements which further adds to the cost, for instance, to the cost of ownership of the vehicle which uses such components.

Examples of a fastener assembly are provided which can be used for coupling components together, for instance, even for coupling one component to another against the force of gravity. The fastener assembly may be used for securing two components, such as connecting a trim to the body of a vehicle or for securing a urea tank cover to a urea tank on an underside of a vehicle. The fastener assembly, in accordance with the examples of the present subject matter, is designed to absorb substantially high loads and vibrations, have high serviceability, long service life, and is low cost.

According to one example of the present subject matter, the fastener assembly can include a grommet and a pin insertable into the grommet. The grommet has a first end and a second end opposite to the first end. The grommet can include a body, such as a hollow cylindrical body, and a collar provided at the second end. On an exterior surface of the body of the grommet, flexible snaps may be provided which cooperate with locking portions in the one of the components to secure the two components. In an assembled condition, i.e., the condition in which the fastener assembly is connected to the two components for securing them, the two components can be sandwiched between the flexible snaps and the collar of the grommet. In such a case, in an example, the thickness of the components to be coupled can have a bearing on the design of the fastener assembly, for instance, on a distance between engaging portion of the flexible snap and the collar. In other words, the fastener assembly can be designed with the distance between engaging portion of the flexible snap and the collar based on the thickness of the components.

The fastener assembly, in operation, may be inserted through aligned openings in the mating components to be fastened together and the aligned openings have substantially the same lateral width as that of the grommet. In other words, the grommet can be inserted into the aligned openings in the mating components without requiring a considerable amount of force till the point where the components to be secured comes into contact with the flexible snaps. The flexible snaps, on the other hand, may extend laterally or radially from the body of the grommet, beyond the lateral width of the opening. As the grommet is inserted into the aligned openings, the flexible snaps may flex inwards to allow the grommet to be inserted therein. Once the flexible snaps are inserted beyond the aligned openings, they may snap out to engage at the other end of the aligned openings, resulting in firm locking of the grommet with the component.

As mentioned above, the fastener also includes the pin which may have a cylindrical rigid body in form of a shaft and is formed to fit inside the hollow cylindrical cavity of the grommet. When completely inserted into the grommet, the pin provides reinforcement or support to the flexible snaps of the grommet and restricts the inwards movement of the flexible snaps. In other words, the flexible snaps of the grommet rest against the outer surface of the pin and cannot be flexed radially inwards. The lack of inwards movement of the flexible snaps rigidly locks the fastener assembly with the aligned openings of the components to rigidly connect the two components. One end of the pin may be bevelled for easy location of the hole in the grommet whereas the other end of the pin may include a head. Further, the pin may have a groove provided in proximity of the head, the groove formed along a circumference of the body of the pin. As will be explained later, the head and the groove of the pin may be configured for locking with the grommet for providing additional locking of the fastener assembly to prevent it from breaking under various loads.

For locking with the pin, the grommet may further include engagement members which may be formed at the proximal end of the grommet. The engagement members may be configured to mate and engage with the pin to hold the pin which allows for distribution of the loads on the fastener assembly, in turn, facilitating the fastener assembly to have a considerably long service life. In one example, the grommet may have a first set of engagement members, referred to as first engagement members hereinafter, which can engage with a second groove of the pin in a semi-assembled position of the pin, i.e., when the pin is inserted into the grommet but not completely such that, for example, the pin does not interfere with the flexible snaps. The first engagement members can engage with a first groove of the pin in a fully-assembled position of the pin, i.e., when the pin is completely inserted into the grommet. The first groove is linearly displaced from the second groove. In another example, the grommet may include a second set of engagement members, referred to as second engagement members, which can engage and lock the head of the pin to prevent the pin from being inadvertently pushed out of the grommet, when the pin is in the fully-assembled position with the grommet, i.e., when a substantial length of the pin is inserted into the grommet to engage with the flexible snaps and to disallow inward retraction of the flexible snaps. In yet another example, the grommet can include both the first and second engagement members to lock the pin therewith. Such a provision, as explained in the foregoing examples, provides reinforcement to the flexible snaps and a firm locking action and at the same time, facilitates in the distribution of the load on the fastener assembly. Therefore, as an example, the load of the components being coupled is borne collectively by the flexible snaps, the first engagement members, and the second engagement members.

In addition, according to an aspect of the present subject matter, the fastener assembly can be designed to have load-absorption capabilities. Accordingly, when the fastener assembly is used in components in moving applications, such as in case of vehicular applications, where the components as well as the fastener assembly has to bear loads due to vibration also, the fastener assembly is able to absorb such loads without undergoing failure. In one example, the point of connection of the flexible snap on the body of the grommet can be designed to have high flexural ability as well as strength to be able withstand the load as well as to be able to absorb the vibrational loads. In said example, at the point of connection of the flexible snaps to the body, a cut-out portion may be provided, achieved by the removal of material at the point of connection. In addition, the design of the flexible snaps, for instance, the provision of the cut-outs at the point of connection, can also allow for reduction in the extraction force for removing the fastener assembly, and thereby, disengaging the two components, for example, in the event of repair, replacement, or general servicing of the components.

In another example, there may be other design features provided in the fastener assembly to achieve the load-absorption ability. For example, the first engagement member and/or the second engagement member can be designed to have enough flexural ability, in addition to strength, to be able to absorb the loads, such as vibrational loads.

These and other advantages of the present subject matter would be described in greater detail in conjunction with the following figures. While aspects of the fastener assembly can be implemented in any number of different configurations, the embodiments are described in the context of the following device(s).

Figure 1:
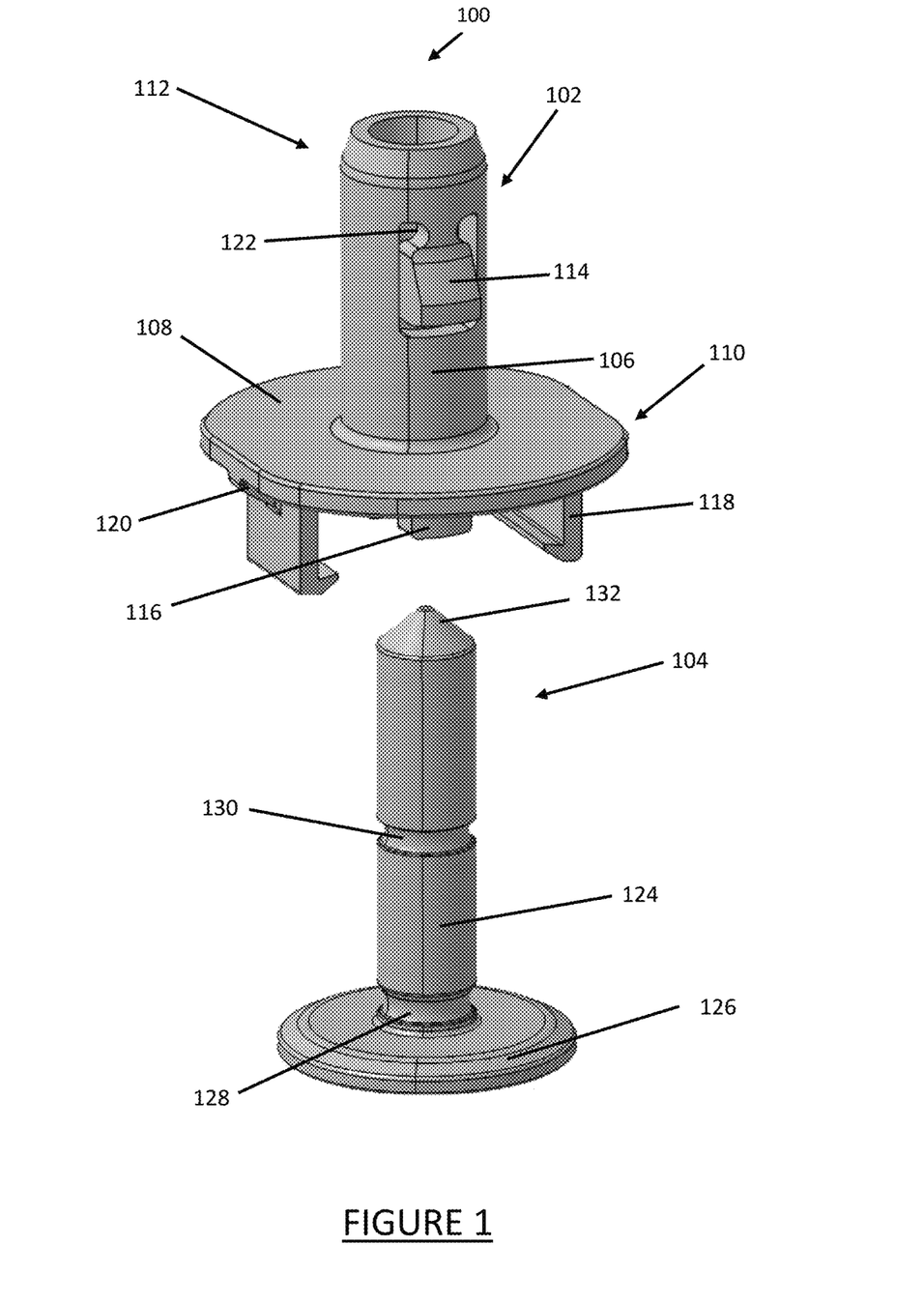
FIG. 1 illustrates a perspective view of components of a fastener assembly in an unassembled state, in accordance with an example of the present subject matter.
Figure 2:
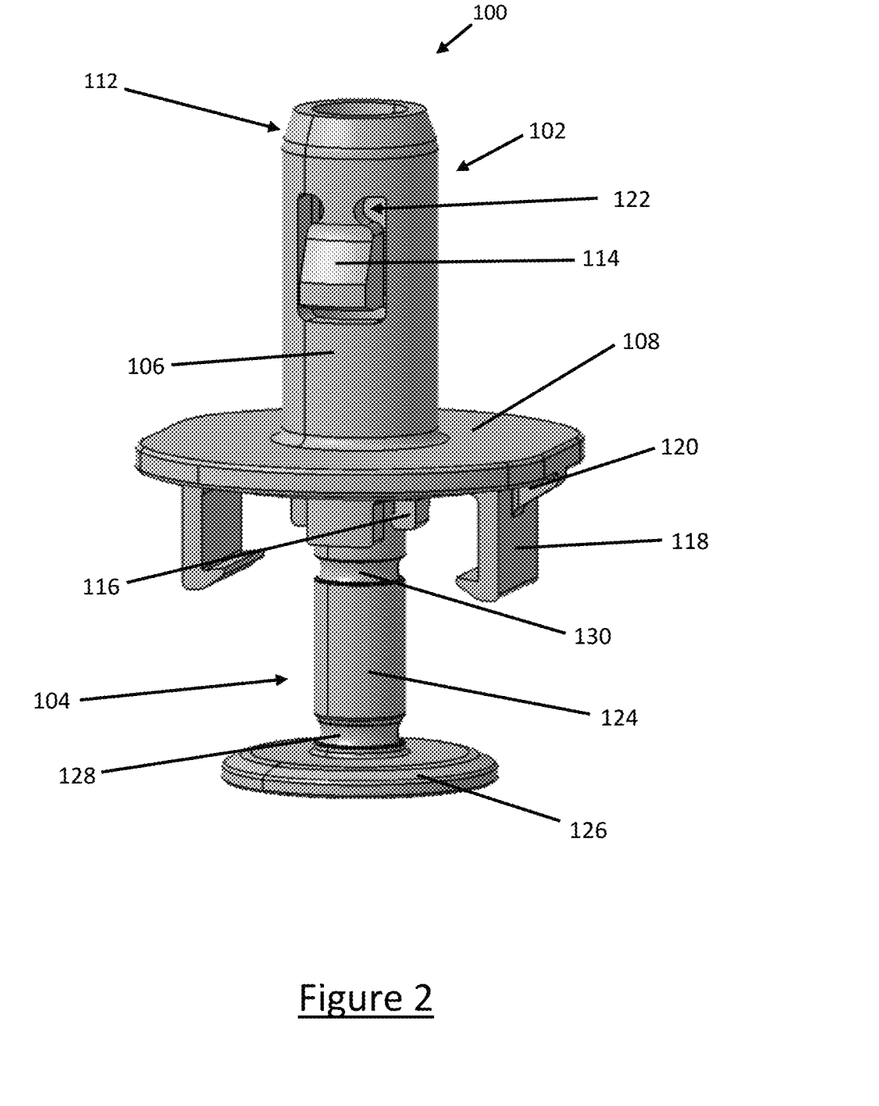
FIG. 2 illustrates a perspective view of the fastener assembly, in accordance with an example of the present subject matter.

FIG. 1 illustrates a fastener assembly 100 with the individual components of the fastener assembly 100 in an unassembled state, in accordance with one example of the present subject matter. FIG. 2 illustrates the fastener assembly 100 with the grommet 102 in semi-assembled condition with the pin 104 (before being assembled, for example, for supplying, referred to as a pre-push condition), according to an example of the present subject matter. For the sake of brevity and ease of understanding, FIG. 1 and FIG. 2 have been described in conjunction hereinafter.

In an example. the fastener assembly 100 may include a grommet 102 and a pin 104. The grommet 102 may include a body 106 which is formed as an elongated hollow cylindrical cavity. The body 106 includes a first end 112 and a second end 110 opposite to the first end 112. The grommet 102 includes a collar 108 provided at the second end 110 of the body 106. The collar 108 provides support for the components to be connected. In one example, the grommet 102 may include a bevelled surface for easy location of a cavity in the components to be secured. Moreover, in an example, the first end 112 may be either closed or open.

Moreover, the grommet 102 may further include a flexible snap 114 connected to an external surface of the body 106. In an example, multiple flexible snaps 114 may be connected circumferentially to the body 106 of the grommet 102. The flexible snap 114 flexes in a radial direction with respect to a central longitudinal axis. The flexible snap flexes towards the central longitudinal axis of the grommet 102 when a force is applied onto the flexible snap 114. Further, the flexible snap 114 flexes away from the central longitudinal axis when no force is applied onto the flexible snap 114. Further, the components to be connected together may be provided with a cavity adapted to receive the fastener assembly 100. In an example, the cavity may have a stepped cross-sectional profile. The stepped profile allows for the flexible snaps 114 to execute locking action with the component to be connected.

Further, in an example, at a point where the flexible snaps 114 connects to the body 106, the flexible snaps 114 may include a flexural portion having a cut-out 122. In other words, the cut-out 122 may be provided at the junction of the body 106 and the flexible snap 114. In one example, the cut-out 122 may be formed by removing material at the point of connection by using different machining process. Due to provision of the cut-out 122, the flexibility of the flexible snaps 114 increases, therefore reducing the extraction force required to remove the fastener assembly 100, and thereby, disengaging the two components, for example, in the event of repair, replacement, or general servicing of the components. Further, the cut-out 122 not only enhances the flexibility of the flexible snap 114, but also absorbs undue vibrations and load on the flexible snap 114. In an example, each flexible snap 114 may include more than one cut-out 122 formed at the junction of the body 106 and the flexible snap 114.

Further, the collar 108 of the grommet 102 may be provided with a plurality of engagement members. The plurality of engagement members include a first set of engagement member, herein referred to as the first engagement member 116, and a second set of engagement members, herein referred to as the second engagement member 118. The first engagement member 116 and the second engagement member 118 may be formed as snap-fit lugs. In an example, the underside of the collar 108 may be provided with the first engagement member 116. In other words, the first engagement member 116 extend from the collar 108 in a direction opposite to the body 106. The first engagement member 116 are provided circumferentially in proximity of an edge of the hollow cylindrical cavity of the body 106. In other words, the first engagement member 116 may be formed in proximity of the circumference of the body 106 at the second end 110. The first engagement member 116 extend towards the central longitudinal axis to partially overlap with the hollow cylindrical cavity. In other words, the free end of the first engagement member 116, having a snap-fit lug type structure, extends towards the central longitudinal axis. Further, the free ends of the first engagement member 116 (when viewed from the top) partially overlap with the hollow cylindrical cavity. In an example, the first engagement member 116 is configured to engage with furrows or grooves provided in a shaft 124 of the pin 104.

Further, in an example, the underside of the collar 108 may be provided with the second engagement member 118.

In other words, the second engagement member 118 extend from the collar 108 in a direction opposite to the body 106. The second engagement member 118 is provided circumferentially in proximity of a rim of the collar. The second engagement member 118 may be formed in proximity of the circumference of the collar 108 at the second end 110. The second engagement member 118 extends towards the central longitudinal axis to partially overlap with a head 126 of the pin 104. In other words, the free end of the second engagement member 118, having a snap-fit lug type structure, extends towards the central longitudinal axis. Further, the free ends of the second engagement member 118 (when viewed from the top) partially overlap with the head 126 of the pin 104. In an example, the second engagement member 118 is configured to engage with a head 126 of the pin 104.

In an example, the first engagement member 116 and the second engagement member 118 engage with the pin 104 by means of snapping locking action. Moreover, the second engagement member 118 may include a rib 120 which may be provided at the underside of the collar 108 to provide additional reinforcement to the second engagement member 118, thereby limiting the flexibility of the engagement member. Moreover, in an example, the first engagement member 116 and the second engagement member 118 may be formed more than one in number, as per the application of the fastener assembly 100.

The pin 104 of the fastener assembly 100 may be formed as a rigid component formed in the shape of a cylinder. The pin 104 includes a head end and an inserting end opposite to the head end. The pin 104 may include the shaft 124 which can be inserted into the body 106 of the grommet 102 via the inserting end. Further, the head end may include the head 126. In an example, the head 126 may be formed with the dimensions so as to be engageable with the second engagement member 118 of the grommet 102 by the snapping action of the second engagement member 118.

Further, the shaft 124 of the pin 104 may include furrows or grooves formed at an external surface of the shaft 124. In an example, the pin 104 may include a first groove 130 and a second groove 128 extending circumferentially on the shaft 124. The second groove 128 is formed at the foot of the shaft 124 at the junction where the shaft 124 contacts the head 126. In other words, the second groove 128 is formed in proximity of the head end of the pin 104. Further, the second groove 128 may be formed such that a first engagement member 116 of the grommet 102 mates and engages with the second groove 128 in a fully-assembled condition of the pin 104, as will be explained later. Moreover, the first groove 130 is linearly displaced from the second groove 128 towards the inserting end. In other words, the first groove 130 is formed at a predefined distance from the second groove 128 towards the inserting end of the pin 104. Further, the first groove 130 may be formed such that the first engagement member 116 of the grommet 102 mates and engages with the first groove 130 in a semi-assembled condition of the pin 104, as will be explained later. In a further example, the first groove 130 and the second groove 128 may be provided as a concave furrow or slots formed on the outer surface of the shaft 124 of the pin 104.

The pin 104 further includes a nose 132 (as shown in FIG. 1) formed at the inserting end of the pin 104. In an example, the nose 132 may be bevelled to provide easy location of the opening of the grommet 102. Further, the nose 132 has a complementary bevelled surface to substantially match the bevelled surface of the grommet 102.

In one example, the fastener assembly 100 may only include the first engagement member 116. In another example, the fastener assembly 100 may include both the first and second engagement member 116, 118. Such a provision, provides additional reinforcement to the flexible snaps and a firm locking action and at the same time, facilitates in the distribution of the load on the fastener assembly. Therefore, as an example, the load of the components being coupled is borne collectively by the flexible snaps, the first engagement members, and the second engagement members. In addition, according to an aspect of the present subject matter, the fastener assembly can be designed to have load-absorption capabilities. Accordingly, when the fastener assembly is used in components in moving applications, such as in case of vehicular applications, where the components as well as the fastener assembly has to bear loads due to vibration also, the fastener assembly is able to absorb such loads without undergoing failure.

Moreover, in one aspect of the invention, the first groove 130 and the second groove 128 on the shaft 124 are formed so as to enable the pin 104 to be installed into the grommet 102 at two different positions, e.g. pre-push condition of the fastener assembly 100 and the installed condition of the fastener assembly 100, the features of which would be described in detail with respect to FIG. 4 and FIG. 5 later in the description. The pin 104 has been shown in conjunction with the grommet 102 in semi-assembled condition in FIG. 2. The semi-assembled condition of the pin 104 is similar to the pre-push condition of the fastener assembly 100 and the fully-assembled condition of the pin 104 is similar to the installed condition of the fastener assembly 100. In the semi-assembled condition of the pin 104 or the pre-push condition of the fastener assembly 100, the pin 104 is partially inserted into the grommet 102 but not completely such that, for example, the pin 104 does not interfere with the flexible snaps 114. In this condition, the first engagement member 116 engages with the first groove 130. In the fully-assembled condition of the pin 104 or the installed condition of the fastener assembly 100, the pin 104 is completely inserted into the grommet 102. In this condition, the first engagement member 116 engages with the second groove 128 to prevent the pin from being inadvertently pushed out of the grommet, when the pin is in the fully-assembled position with the grommet, i.e., when a substantial length of the pin is inserted into the grommet to engage with the flexible snaps and to disallow inward retraction of the flexible snaps.

Figure 3A:
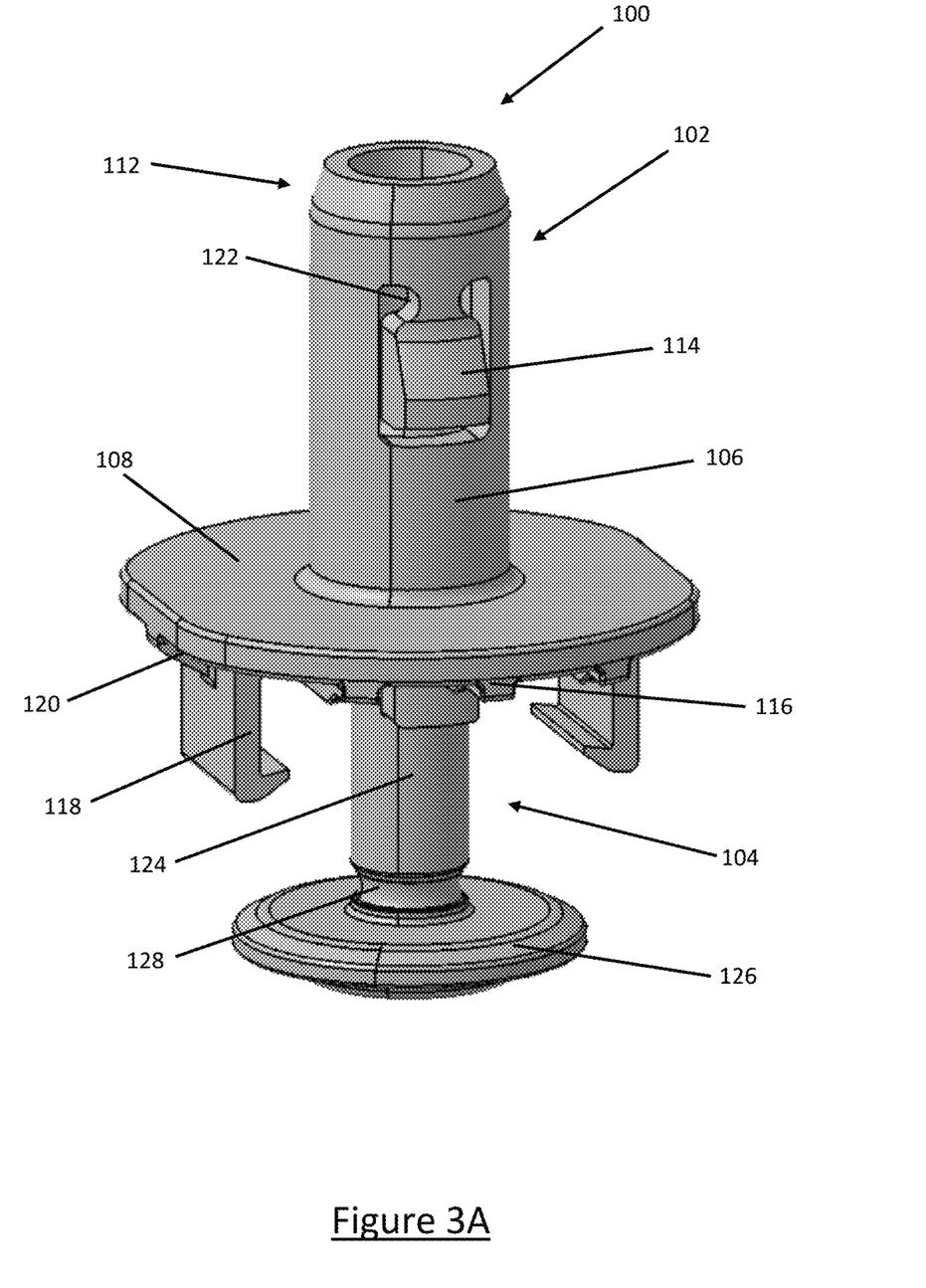
FIG. 3A illustrates the fastener assembly is in pre-push condition, in accordance with an example of the present subject matter.
Figure 3B:
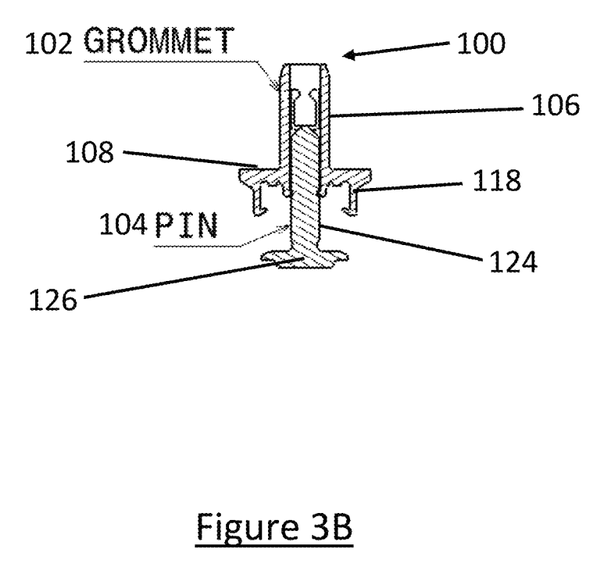
FIG. 3B illustrates the cross-sectional view of the fastener assembly in pre-push condition, in accordance with an example of the present subject matter.
Figure 3C:
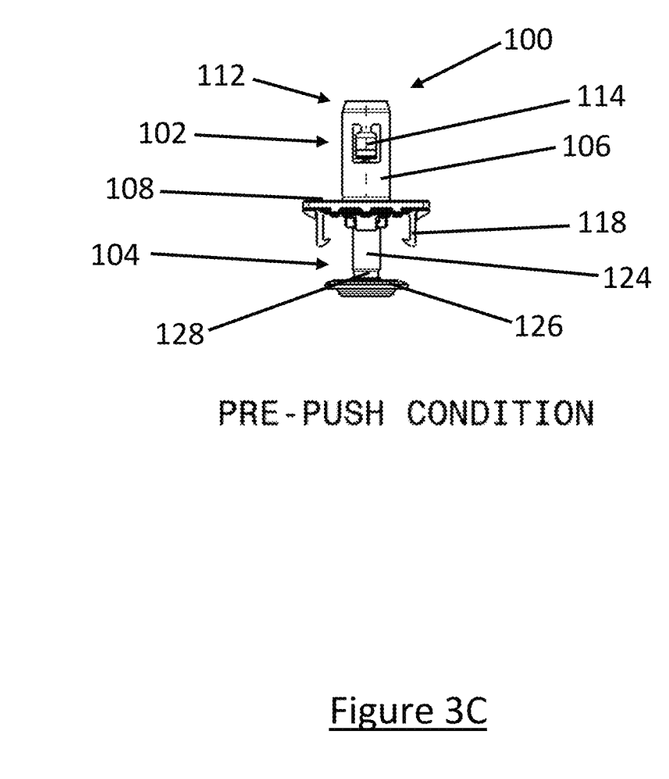
FIG. 3C illustrates the front view of the fastener assembly in pre-push condition, in accordance with an example of the present subject matter.
Figure 3D:
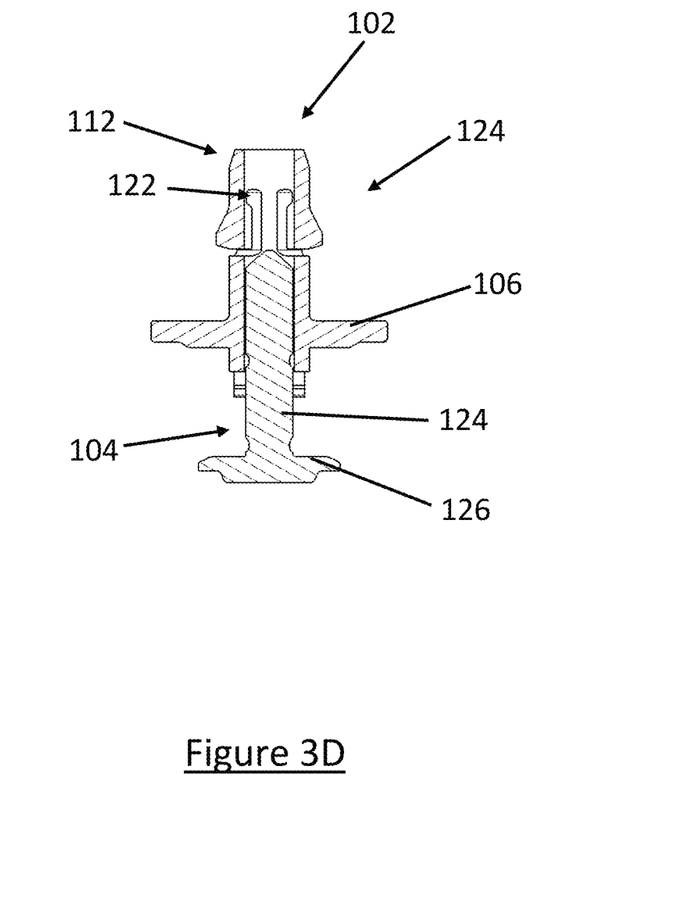
FIG. 3D illustrates the cross-section of the fastener assembly in pre-push condition rotated 90 degrees from the position shown in FIGS. 3B and 3C, in accordance with an example of the present subject matter.

FIG. 3A illustrates the fastener assembly 100, in accordance with one of the examples of the present subject matter wherein the fastener assembly 100 is in pre-push condition. FIG. 3B illustrates the cross-sectional front view of the fastener assembly 100, in accordance with one of the examples of the present subject matter wherein the fastener assembly 100 is in pre-push condition. Further, FIG. 3C illustrates the front view of the fastener assembly 100, in accordance with one of the examples of the present subject matter. Moreover, FIG. 3D illustrates the cross-sectional of the fastener assembly 100 rotated 90 degrees from the position shown in FIGS. 3B and 3C, in accordance with one of the examples of the present subject matter wherein the fastener assembly 100 is in pre-push condition.

The pre-push condition, as described above, may be the state of the fastener assembly 100 in which the fastener can be supplied. For instance, in the pre-push condition, the fastener assembly 100 can be supplied and the pin can remain in that condition as described hereinafter. In other words, the pin 104 does not inadvertently go into the grommet 102. In order to bring the fastener assembly 100 from an unassembled state to the pre-push condition, the pin 104 is inserted into the cavity of the grommet 102. The pin 104 is inserted into the grommet 102 till the first engagement member 116 of the grommet 102 snaps in with the first groove 130 of the pin 104. In the given state, the fastener assembly 100 is supplied out of the manufacturing unit, wherein the pin 104 cannot be accidently moved in or out of the grommet 102 during supply and transit of the same. Furthermore, for the final assembly of the components, the fastener assembly 100 used is always in the pre-push condition, only after which the fastener assembly 100 is brought to the installed condition for the final assembly. As can be seen from the figures, the first engagement member 116 of the grommet 102 are snapped into the first groove 130, thereby limiting the movement of the pin 104 inside the body 106 of the grommet 102. Further, the second engagement member 118 of the grommet 102 may be observed to be not engaged with the head 126 of the pin 104. Moreover, the flexible snaps 114 are observed to be not engaged with the component.

Figure 4A:
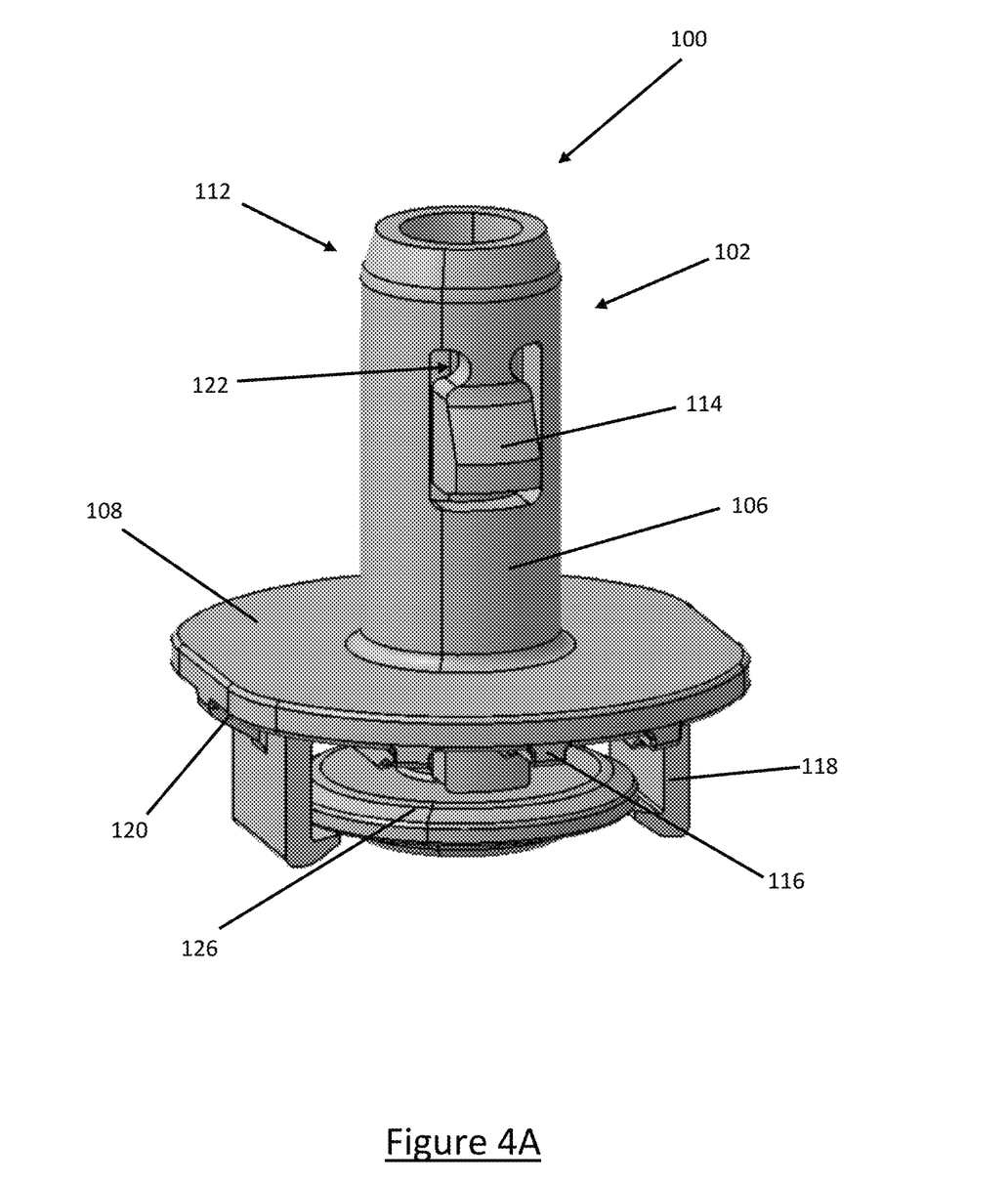
FIG. 4A illustrates the fastener assembly in installed condition, in accordance with an example of the present subject matter.
Figure 4B:
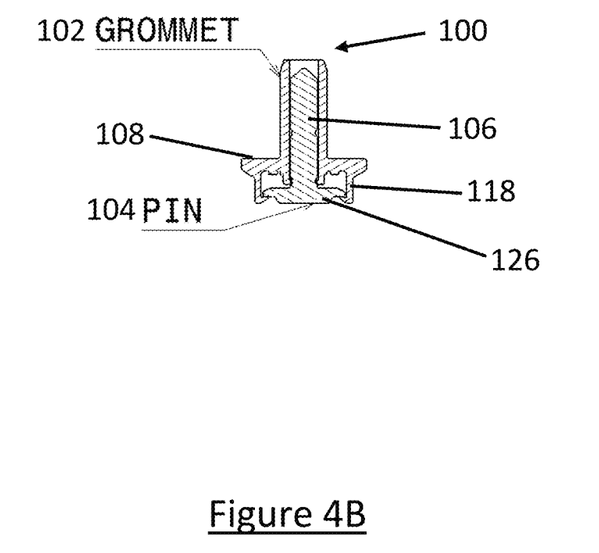
FIG. 4B illustrates the cross-sectional view of the fastener assembly in installed condition, in accordance with an example of the present subject matter.
Figure 4C:
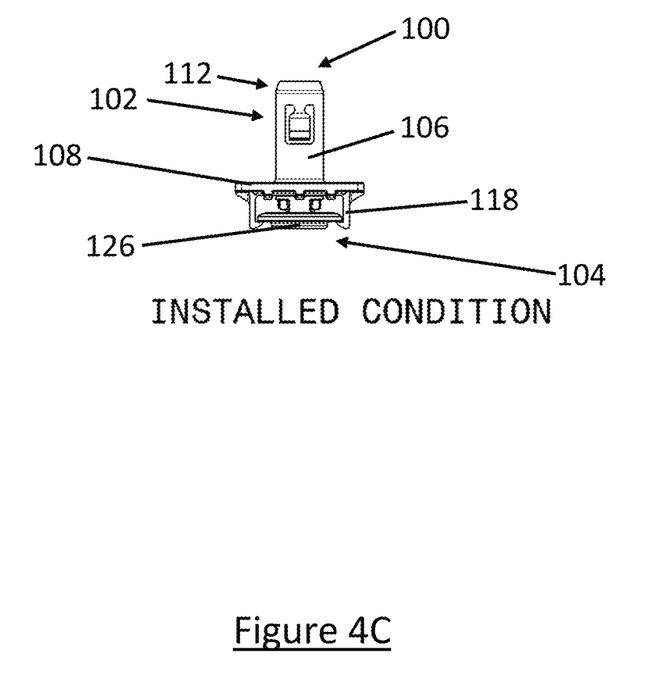
FIG. 4C illustrates the front view of the fastener assembly in installed condition, in accordance with an example of the present subject matter.
Figure 4D:
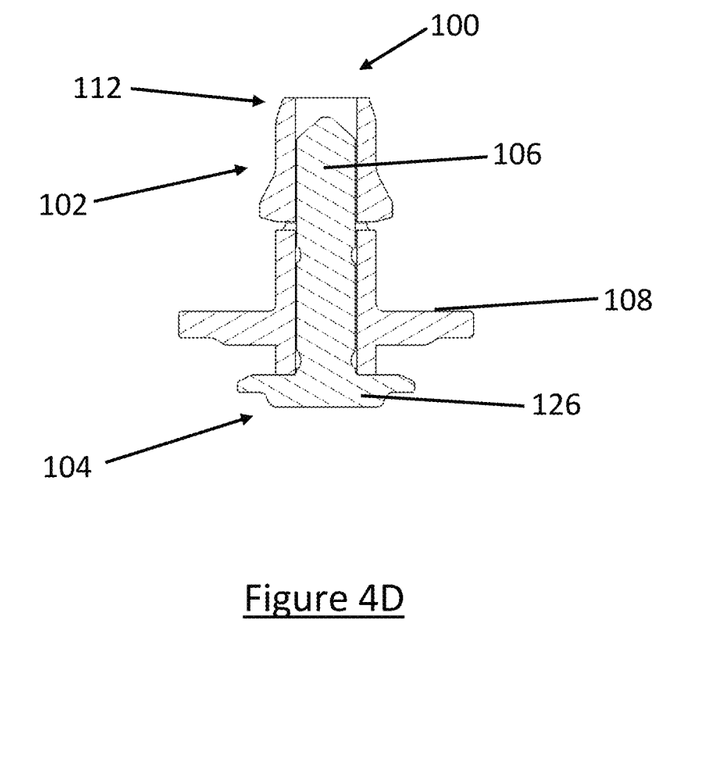
FIG. 4D illustrates the cross-section of the fastener assembly in installed condition rotated 90 degrees from the position shown in FIGS. 4B and 4C, in accordance with an example of the present subject matter.

FIG. 4A illustrates the fastener assembly 100, in accordance with one of the examples of the present subject matter wherein the fastener assembly 100 is in installed condition. FIG. 4B illustrates the cross-sectional view of the fastener assembly 100, in accordance with one of the examples of the present subject matter wherein the fastener assembly 100 is in installed condition. Further, FIG. 4C illustrates the front view of the fastener assembly 100, in accordance with one of the examples of the present subject matter wherein the fastener assembly 100 is in installed condition. Moreover, FIG. 4D illustrates the rotated cross-section of the fastener assembly 100 rotated 90 degrees from the position shown in FIGS. 4B and 4C, in accordance with one of the examples of the present subject matter wherein the fastener assembly 100 is in installed condition.

The installed condition may be defined as the state of the fastener assembly 100 in which the fastener assembly 100 finally rests upon final installation or assembly of the components. In order to bring the fastener assembly 100 from the pre-push condition to the installed condition, the pin 104 is completely pushed into the cavity of the grommet 102 of the fastener assembly 100. In an example, wherein the pin 104 is completely inserted into the grommet 102, the first engagement member 116 of the grommet 102 mate and engage with the second groove 128 of the pin 104. Further, in such state, the second engagement member 118 of the grommet 102 engages with the head 126 of the pin 104. The engagement members, therefore, provide additional locking to the fastener assembly 100.

In an example, for the final assembly of the components to be assembled with the fastener assembly 100, the cavities of the components are axially aligned with the axis of the fastener assembly 100. Further, the fastener assembly 100 is pushed into the components which are to be assembled or installed together by means of the fastener assembly 100, wherein the flexible snaps 114 of the grommet 102 flex inwards to align the circumference of the grommet 102 with the circumference of the cavity of the component. When completely inserted into the grommet 102, the pin 104 provides reinforcement or support to the flexible snaps 114 of the grommet 102 and restricts the inwards movement of the flexible snaps 114. In other words, the flexible snaps 114 of the grommet 102 rest against the outer surface of the pin 104. The lack of inwards movement of the flexible snaps 114 rigidly locks the fastener with the aligned openings of the components to rigidly connect the two components. Further, the flexible snap 114 may rest against the stepped profile of the cavity formed in the components.

Figure 5:
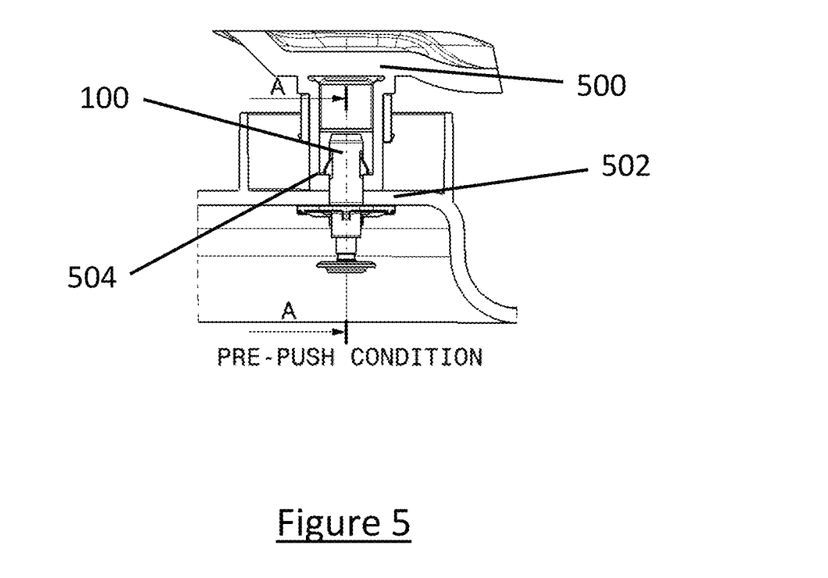
FIG. 5 illustrates the fastener assembly in the pre-push condition showing assembled with components, in accordance with an example of the present subject matter.

FIG. 5 illustrates the fastener assembly 100, in accordance with one of the examples of the present subject matter wherein the fastener assembly 100 is in pre-push condition along with the components to be assembled therewith. In an example, vehicular components may be assembled with the fastener assembly 100. In another example, the components to be assembled with the fastener assembly 100 may a urea tank 500 and a urea tank cover 502. In order to assemble the components together, the cavities of the urea tank 500 and the urea tank cover 502 are aligned axially. Further, the fastener assembly 100 in the pre-push condition is then inserted into the aligned cavities of the urea tank 500 and urea tank cover 502.

As the fastener assembly 100 is inserted into the aligned openings, the flexible snaps 114 of the grommet 102 may flex inwards to allow the grommet 102 to be inserted therein. Once the flexible snaps 114 are inserted beyond the aligned openings, they may snap out to engage with a stepped profile 504 at the other end of the aligned openings, resulting in firm locking of the grommet 102 of the fastener assembly 100 with the urea tank 500 and the urea tank cover 502. As can be seen from the figure, the urea tank 502 has the stepped profile 504 on which the flexible snaps 114 of the grommet 102 rest.

Figure 6:
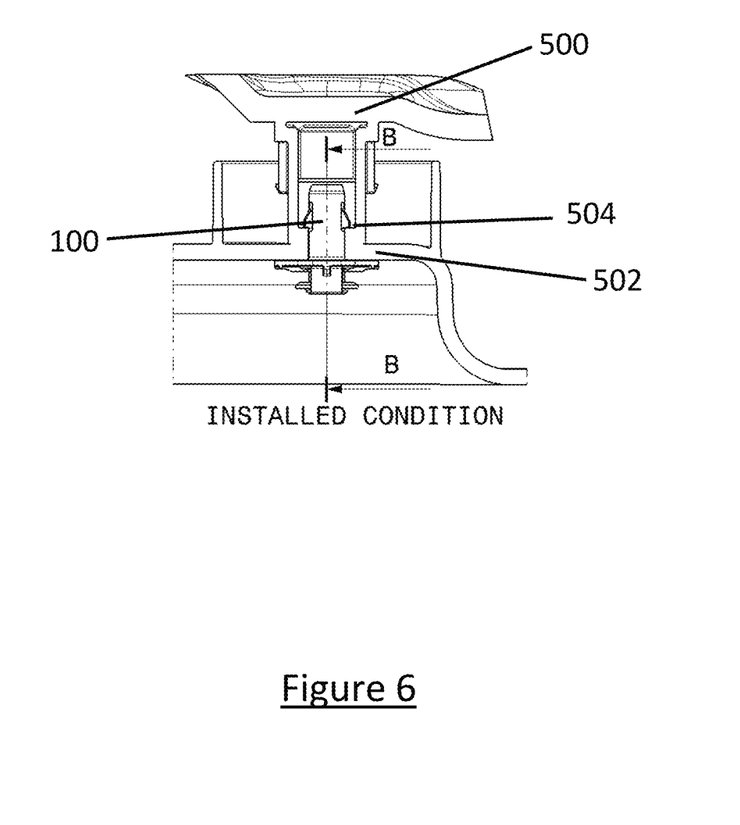
FIG. 6 illustrates the fastener assembly in the installed condition assembled with the components, in accordance with an example of the present subject matter.

FIG. 6 illustrates the fastener assembly 100, in accordance with one of the examples of the present subject matter wherein the fastener assembly 100 is in installed condition along with the components to be assembled therewith. As can be seen from the figure, the pin 104 of the fastener assembly 100 is completely inserted into the grommet 102. Further, it may be observed that the first engagement member 116 of the grommet 102 mate and engage with the second groove 128 of the pin 104. Further, in such state, the second engagement member 118 of the grommet 102 engages with the head 126 of the pin 104. Moreover, when completely inserted into the grommet 102, the pin 104 provides reinforcement or support to the flexible snaps 114 of the grommet 102 and restricts the inwards movement of the flexible snaps 114. In other words, the flexible snaps 114 of the grommet 102 rest against the outer surface of the pin 104. The lack of inwards movement of the flexible snaps 114 rigidly locks the fastener assembly 100 with the aligned openings of the urea tank 500 and urea tank cover 502 to rigidly connect the two components together.

The present subject matter, as explained above, provides reinforcement to the flexible snaps 114 and a firm locking action and at the same time, facilitating in the distribution of the load on the fastener assembly 100. Therefore, as an example, the load of the components being coupled is borne collectively by the flexible snaps 114, the first engagement members 116, and the second engagement members 118.

Although examples for the fastener assembly 100 have been described in language specific to structural features and/or methods, it is to be understood that the appended claims are not limited to the specific features described. Rather, the specific features are disclosed as examples of the fastener assembly 100.

We claim:
1. A fastener assembly comprising:
 a grommet, comprising:
  a body having a hollow cylindrical cavity having a first end and a second end opposite to the first end, the body comprising flexible snaps connected to an exterior surface of the body, wherein the flexible snaps are configured to flex in a radial direction with respect to a central longitudinal axis, and a collar provided at the second end of the body, the collar comprising a first engagement member extending from the collar in a direction opposite to the body; and a pin comprising a shaft insertable into the body to cooperate with the flexible snaps to prevent radially inward movement of the flexible snaps, wherein the shaft includes a first groove and a second groove, which extend circumferentially on the shaft and are configured to engage with the first engagement member when the pin is inserted into the hollow cylindrical cavity of the body.

2. The fastener assembly of claim 1, wherein, at a point of connection of each of the flexible snaps to the body, each of the flexible snaps comprises a flexural portion having a cut-out.

3. The fastener assembly of claim 1, wherein the pin comprises:
a head end having a head;
an inserting end opposite to the head end, to insert the pin into the grommet; and
wherein the second groove is formed in proximity of the head end and the first groove is linearly displaced from the second groove towards the inserting end.

4. The fastener assembly of claim 3, wherein the first engagement member is provided circumferentially in proximity of an edge of the hollow cylindrical cavity of the body and extending towards the central longitudinal axis to partially overlap with the hollow cylindrical cavity, wherein the first engagement member is configured to detachably couple with the first groove and the second groove when the pin is inserted into the grommet.

5. The fastener assembly of claim 4, wherein the first engagement member is formed as a snap-fit lug.

6. The fastener assembly of claim 4, wherein the first engagement member is configured to detachably couple with the first groove in a semi-assembled position of the pin in the grommet and is configured to detachably couple with the second groove in a fully-assembled position of the pin in the grommet.

7. The fastener assembly of claim 4, wherein the collar further comprises a second engagement member extending from the collar in a direction opposite to the body, the second engagement member provided circumferentially in proximity of a rim of the collar and extending towards the central longitudinal axis, wherein the second engagement member is configured to couple with the head of the pin in a fully-assembled position of the pin in the grommet.

8. The fastener assembly of claim 7, wherein the second engagement member is formed as a snap-fit lug.

9. The fastener assembly of claim 1, wherein the grommet comprises a beveled surface at the first end of the grommet.

10. The fastener assembly of claim 9, wherein the pin, at an inserting end, comprises a complementary beveled surface to substantially match the beveled surface of the grommet.

11. A fastener assembly comprising:
a grommet, comprising:
a body having a hollow cylindrical cavity having a first end and a second end opposite to the first end, the body comprising flexible snaps connected to an exterior surface of the body, wherein the flexible snaps are configured to flex in a radial direction with respect to a central longitudinal axis, and a collar provided at the second end of the body, the collar comprising engagement members extending from the collar in a direction opposite to the body, the engagement members including a first engagement member being provided circumferentially in proximity of an edge of the hollow cylindrical cavity of the body and extending towards the central longitudinal axis to partially overlap with the hollow cylindrical cavity; and a pin comprising a shaft insertable into the body to cooperate with the flexible snaps to prevent radially inward movement of the flexible snaps and including a first groove and a second groove, each of the first groove and the second groove extending circumferentially on the shaft and being configured to detachably couple with the first engagement member when the pin is inserted into the hollow cylindrical cavity of the body.

12. The fastener assembly of claim 11, wherein, at a point of connection of each of the flexible snaps to the body, each of the flexible snaps comprises a flexural portion having opposing cut-outs.

13. The fastener assembly of claim 11, wherein the first engagement member is configured to detachably couple with the first groove in a semi-assembled position of the pin in the grommet and is configured to detachably couple with the second groove in a fully-assembled position of the pin in the grommet.

14. The fastener assembly of claim 13, wherein the pin does not interfere with inward movement of the flexible snaps in the semi-assembled position of the pin in the grommet.

15. The fastener assembly of claim 13, wherein the pin is configured to prevent inward movement of the flexible snaps in the fully-assembled position of the pin in the grommet.

16. The fastener assembly of claim 11, wherein the pin further includes a head extending from the shaft proximate the second groove.

17. The fastener assembly of claim 16, wherein the engagement members include a second engagement member, the second engagement member being provided circumferentially in proximity of a rim of the collar and being configured to couple with the head of the pin in a fully-assembled position of the pin in the grommet.

18. The fastener assembly of claim 17, wherein a free end of the second engagement member includes a snap-fit lug extending towards the central longitudinal axis to couple with the head of the pin in a fully-assembled position of the pin in the grommet.

19. The fastener assembly of claim 17, wherein a rib extends between the second engagement member and the collar.

20. The fastener assembly claim 11, wherein a free end of the first engagement member includes a snap-fit lug extending towards the central longitudinal axis to detachably couple with each of the first groove and the second groove.

* * * * *